Mar. 27, 1923.
1,449,570
H. WOOD
FISHING APPARATUS
Dec. 5, 1921.
2 sheets-sheet 1
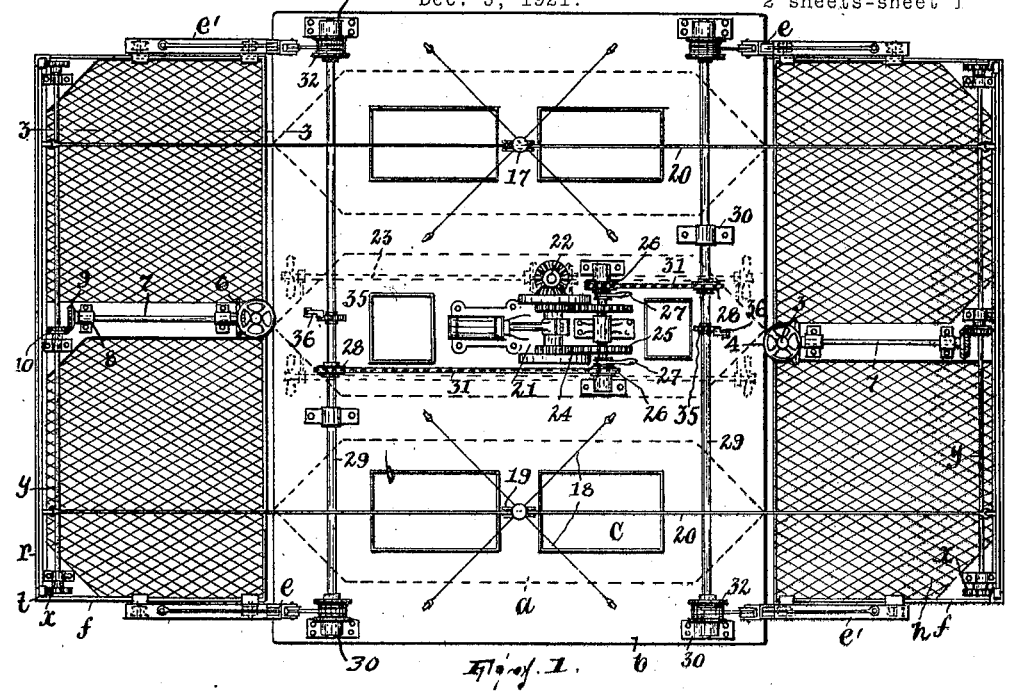
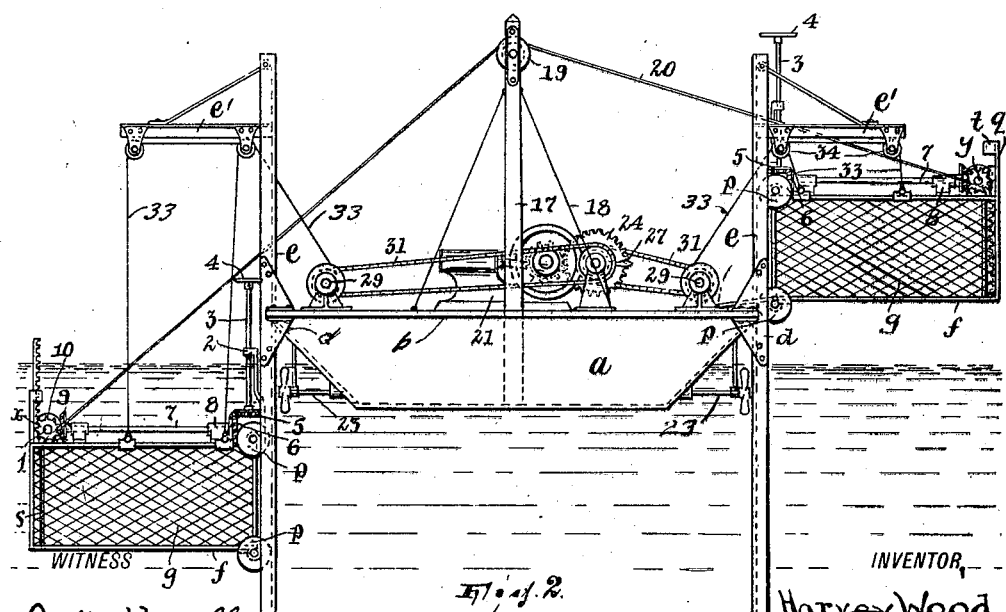
WITNESS
Wm L Bell
INVENTOR
Harvey Wood
BY John Stewart,
ATTORNEY.

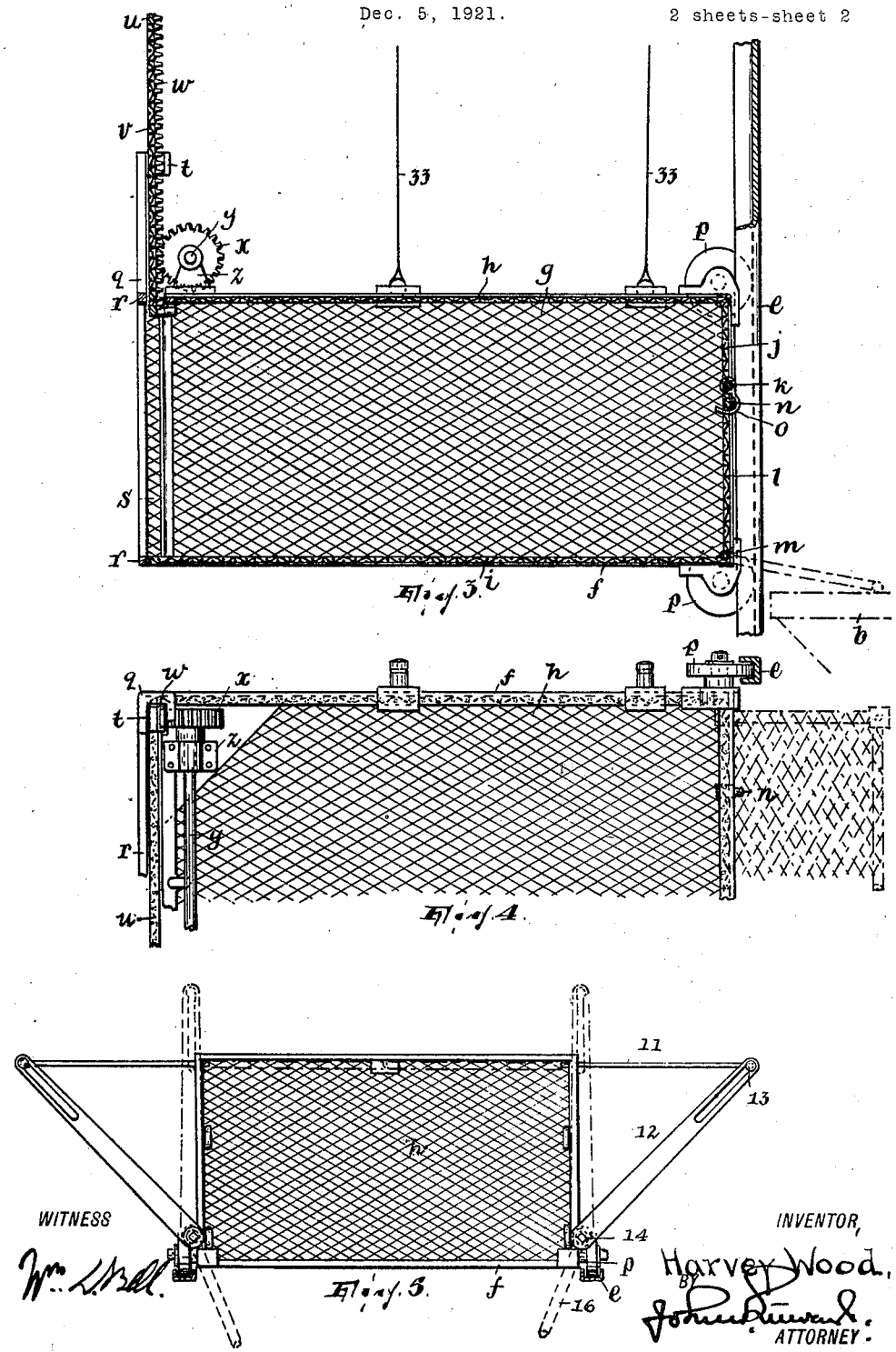

Patented Mar. 27, 1923.

1,449,570

UNITED STATES PATENT OFFICE.

HARVEY WOOD, OF WEST PATERSON, NEW JERSEY.

FISHING APPARATUS.

Application filed December 5, 1921. Serial No. 519,873.

*To all whom it may concern:*

Be it known that I, HARVEY WOOD, a citizen of the United States, residing at West Paterson, in the county of Passaic and State of New Jersey, have invented certain new and useful Improvements in Fishing Apparatus, of which the following is a specification.

The object of this invention is to provide a deep-water fishing apparatus whereby fish may be caught by suspending a net or other suitable receptacle, submerged, from a floating vessel, the net having one open side, and then moving the vessel along the surface of the water in the direction in which the open side of the receptacle faces, the apparatus being so constructed as to insure the capture of the maximum number of fish while the fishing expedition is progressing and to facilitate the work of unloading the captured fish into the vessel.

In carrying out my invention I provide a net or equivalent receptacle and means to raise and lower the same, such receptacle having one open side and preferably a closure therefor with means to open the closure when the receptacle is lowered or submerged and close the same when the receptacle is raised above the surface of the water for the removal of the fish. The receptacle is preferably a suitable reinforced rectangular net and has an opening in the side thereof next to the vessel and a closure for this opening which is closed when the receptacle is submerged and is adapted to be withdrawn when the receptacle is elevated so as to permit access for removal of the fish. In the best form of the invention I propose to use two such receptacles, placing them on opposite sides of the vessel, and provide means for lowering one into position for fishing and raising the other into position for unloading, simultaneously; and in such a construction I further provide a connecting gear between the two receptacles so that in their up and down movements one will act as a counterbalance to the other. I also provide in the preferred construction raising and lowering gear of such character that the two receptacles may be moved simultaneously, one up and the other down, or one independently of the other, as when one is already up it is desired to elevate the other when the vessel is to proceed to or from the fishing ground.

In the drawing,

Figure 1 is a plan of the improved fishing apparatus;

Figure 2 is a side elevation thereof;

Figure 3 is a section on the line 3—3 of Fig. 1;

Figure 4 is a fragmentary plan, partly in section, of one of the nets shown in Fig. 1 and a part of the mechanism for controlling the same and its closures; and Figure 5 is a plan view of one of the nets showing a modified form of closure means for the opening by which the fish enter the net.

The vessel shown consists of several pontoons $a$ upon which is arranged and to which is suitably affixed a deck or platform $b$ preferably rectangular in plan; the deck may have openings or hatches $c$ through which the fish, when removed from the nets, may be deposited in the pontoons. Any other form of vessel may of course be utilized, but for reasons which will be obvious it is preferred that it be rectangular in plan. The direction of travel of the apparatus shown in the drawings is transversely of the sheet of drawing containing Figs. 1 and 2.

By means of stout brackets $d$ arranged at the sides of the vessel which face its directions of travel pairs of channel iron upright guides $e$ are secured rigidly to the vessel, and these have suitably braced out-riggers $e'$ so that in effect they form davits. These davits, as to their portions $d$, form guides in which vertically travel the nets, as will appear.

Each net consists of a rectangular angle iron frame $f$ having preferably strong wire netting stretched thereon and secured thereto in some suitable way so as to form side walls $g$, a top wall $h$ and a bottom wall $i$. What I term the back wall (that is, the upright wall relatively near the vessel) is also formed by netting; but at this side of the net the same preferably has an opening and the netting forms a closure therefor, thus; In the present example a permanent part of the wall, designated $j$, extends from the top of the frame $f$ to a rigid transverse bar $k$, and the remainder of the wall is formed by netting $l$ fixed in a rectangular frame whose bottom bar m is pivoted in the frame f and whose top bar n may be caught and held by the hook or hooks o attached to the bar k, the closure formed by the parts l m n being adapted to swing down, pivotally, into the position indicated by dotted lines in Figs. 3 and 4, i, e., so as to rest on the deck b of the vessel when the net is elevated. At its four inner corners the net frame f is equipped with rollers p adapted to travel in the guideways of the uprights e. The frame f has at its outer corners rigid uprights q which in the planes of the top and bottom walls of the net are rigidly connected by the braces r and which form vertical guideways with the strips s secured to the frame f parallel with and inwardly of the uprights q and spaced therefrom; these uprights q are extended above the top of the net and at their upper ends have inwardly recessed projections t which form extensions of the guideways. In the guideways slides vertically a closure consisting of a rectangular frame u having netting v stretched therein. It will be seen that the outer side of the net (the side away from the vessel) is open; when the net is in use, submerged, the mentioned closure will be raised in the guideways, so as to clear the opening, and when the net is out of use, elevated, the closure will be lowered, as at the right in Fig. 2. The elevation of the closure may be effected as follows: At each side it has a vertical rack w with which mesh the pinions x fixed on the shaft y journaled in brackets z on the net frame f; at the back of the net frame there is journaled in a bracket 2 upstanding therefrom a rotary shaft 3 having a hand-wheel 4 at the top and a bevel pinion 5 at its lower end, the latter meshing with a bevel pinion 6 on a shaft 7 journaled in brackets 8 on the net frame and having a bevel pinion 9 meshing with a bevel pinion 10 on the shaft y. The closure is usually elevated after the net is submerged and raised just before the net is elevated, wherefore the shaft extends high enough to bring the hand-wheel in convenient reach of an operator on the deck in the lowered position of the net. Instead of the closure moving vertically it may move horizontally. Thus in Fig. 5 the closure is formed in two sections 11—11 arranged to travel horizontally in suitable guideways in the outer portion of the net frame; they are adapted to be moved toward and from the closing position by levers 12 which have slot-and-pin connections 13 therewith and which are carried by upright shafts 14 suitably journaled in the net frame and preferably having their upper ends squared to receive the correspondingly squared socket of a removable lever or wrench 16 for turning them.

17 designates two masts, which may be suitably braced by stays 18 and which have grooved sheaves 19. Over these extend the taut cables 20, the ends of each of which are suitably secured to the outer portions of the respective net frames f. By this arrangement the two nets are counterbalanced and their outer portions prevented from sagging.

For raising and lowering the nets a suitable reversible engine or motor 21 is arranged on the deck b. This engine may be connected by the gear 22 with one or more propelling means 23 for the vessel. By gearing 24 the drive shaft of the engine is connected with a shaft 25 parallel therewith. On this shaft are arranged sprocket wheels 26 and clutch devices 27 whereby each of the sprocket wheels may be disconnectively connected with the shaft 25 so as to rotate therewith or be free thereon. Around the sprocket wheels 26 and sprocket wheels 28 on the transverse shafts 29 journaled in suitable bearings 30 on the deck extend sprocket chains 31. The shafts 29 carry drums 32 on which are wound cables 33 that extend up over sheaves 34 on the out-riggers e' and have their outer ends attached to the nets; there are eight of these cables, two being wound on each drum, and one cable in each pair is attached to the net more or less near the vessel and the other somewhat outward thereof so as to distribute the load.

When the apparatus is in use, the fishing ground having been reached, the engine is operated so as to lower one of the nets. The outward closure of this net is then opened and the vessel made to proceed in the direction in which the thus opened side of the net faces until the net has become loaded with fish which enter its open side. Then said closure is closed and the engine operated to raise the net mentioned and lower the other net (at which time the clutches 27 will be in position to render the sprocket wheels 26 both fast on the shaft 25). Having elevated the filled net and lowered the other net, which will of course then have its outer closure opened, and having caused the vessel now to proceed in the direction in which the open side of the now submerged net faces, the hands open the inward closure l of the filled net and with rakes or otherwise remove from this net onto the deck of the vessel and then into the hatches the fish that have been caught. Then this closure is again closed and the net of which it forms a part is lowered and the other net raised, after having closed its outer closure to entrap the fish therein, whereupon the outer closure of the first-named net is raised and the direction of the vessel reversed for continuing the fishing operation with this net while the fish are being removed from the other net and so on.

In order for the vessel to travel to or from the fishing ground, without either net being submerged, the clutch 27 appertaining to the net which is elevated is made to render its sprocket wheel 26 loose on the shaft 25 and then the engine operated to elevate the other net. To prevent the fall of the elevated net at this time a suitable holding means may be provided as the ratchets 35 on shafts 29 and pawls 36 engageable with said ratchets, the pawls being of course both disengaged from the ratchets when the engine is to move the nets in unison.

Having thus fully described my invention, what I claim as new and desire to secure by Letters Patent is:—

1. In a fishing apparatus, a supporting structure including a vessel, an up and down movable submersible hollow net structure guided by the supporting structure and arranged in outboard relation to the vessel and said net being closed except for a fish-receiving opening at one side thereof and a fish-delivery opening at the side thereof adjoining the vessel, a removable closure for the former opening, and means on the supporting structure to raise and lower the net structure.

2. A fishing apparatus including a vessel, submersible net structures arranged on opposite sides thereof, and means on the vessel for raising either net structure and lowering the other in unison.

3. A fishing apparatus including a vessel having upright guiding means at opposite sides thereof, submersible net structures guided by the respective means, and means on the vessel for raising either net structure and lowering the other in unison.

4. A fishing apparatus including a vessel having upright guiding means at opposite sides thereof and an upright support between said sides, submersible net structures guided by the respective means, and a taut flexible connection connecting one net structure with the other and having a running engagement with said support.

In testimony whereof I affix my signature.

HARVEY WOOD.